(12) United States Patent
Al-Kofahi et al.

(10) Patent No.: US 7,072,515 B2
(45) Date of Patent: Jul. 4, 2006

(54) METHOD AND APPARATUS FOR AUTOMATICALLY TRACING LINE-STRUCTURE IMAGES

(75) Inventors: Khalid Al-Kofahi, Rochester, NY (US); Badrinath Roysam, Clifton Park, NY (US); James N. Turner, Delmar, NY (US)

(73) Assignee: Rensselaer Polytechnic Institute, Troy, NY (US)

( * ) Notice: Subject to any disclaimer, the term of this patent is extended or adjusted under 35 U.S.C. 154(b) by 883 days.

(21) Appl. No.: 10/058,543

(22) Filed: Jan. 28, 2002

(65) Prior Publication Data

US 2002/0168110 A1 Nov. 14, 2002

Related U.S. Application Data

(60) Provisional application No. 60/264,056, filed on Jan. 26, 2001.

(51) Int. Cl.
*G06K 9/00* (2006.01)
*G06K 9/48* (2006.01)

(52) U.S. Cl. ..................... 382/199; 382/128
(58) Field of Classification Search ........ 382/128–206, 382/254–275, 286–291, 307, 325
See application file for complete search history.

(56) References Cited

U.S. PATENT DOCUMENTS 6,690,816 B1 * 2/2004 Aylward et al. ............ 382/128

OTHER PUBLICATIONS

Can et al., "Rapid Automated Tracing and Feature Extraction from Retinal Fundus Images Using Direct Exploratory Algorithms," IEEE Transactions on Information Technology in Biomedicine, vol. 3, No. 2, Jun. 1999, pp. 125-138.*
"Rapid Automated Three-Dimensional Tracing of Neurons from Confocal Image Stacks," by K. A. Al-Kofahi, S. Lasek, D. Szarowski, C. Pace, G. Nagy, J. N. Turner, and B. Roysam; IEEE Transactions on Information Technology in Biomedicine; (accepted, to appear) 2002.
"Rapid Automated Tracing and Feature Extraction from Retinal Fundus Images Using Direct Exploratory Algorithms," by A. Can, H. Shen, J. N. Turner, H. L. Tanenbaum, and B. Roysam; IEEE Transactions on Information Technology in Biomedicine, vol. 3, No. 2; Jun. 1999 (pp. 125-138).

(Continued)

*Primary Examiner*—Bhavesh M. Mehta
*Assistant Examiner*—John Strege
(74) *Attorney, Agent, or Firm*—RatnerPrestia

(57) ABSTRACT

A method for rapid, fully automatic, two-dimensional (2-D) and three-dimensional (3-D) tracing of line-structure images, such as images of neurons produced by fluorescence confocal microscopy. A method of recursively following the line-structure topology, guided by the correlation response of a set of $4 \times N^2$ directional kernels in the 3-D case, and a set of $2 \times N$ directional kernels in the 2-D case, is presented. These kernels are derived based on a generalized cylinder model of the line-structures. The automatic tracing method includes a protocol for determining the ends of line-structures.

24 Claims, 8 Drawing Sheets

OTHER PUBLICATIONS

"Confocal Light Microscopy of Brain Cells and Tissue: Image Analysis & Quantitation," by J.N. Turner, W. Shain, D.H. Szarowski, S. Lasek, B. Sipple, C. Pace, K. Al-Kafahi, A. Can and B. Roysam Acta Histochem. Cytochem.; vol. 32, No. 1; 1999 (pp. 5-11).

"Confocal Microscopy and Three-Dimensional Reconstruction of Electrophysiologically Identified Neurons in Thick Brain Slices," J. N. Turner, D. H. Szarowski, K. L. Smith, M. Marko, A. Leith and J. W. Swann; Journal of Electron Microscopy Technique, 18; 1991; (pp. 11-23).

"Iterative, Constrained 3-D Image Reconstruction of Transmitted Light Bright-Field Micrographs Based on Maximum Likelihood Estimation," by B. Willis, B. Roysam, J.N. Turner, and T.J. Holmes; Journal of Microscopy, vol. 169, Pt. 3; Mar. 1993 (pp. 347-361).

"Automated Tracing and Volume Measurements of Neurons From 3-D Confocal Fluorescence Microscopy Data," by A. Cohen, B. Roysam, and J.N. Turner; Journal of Microscopy, vol. 173, Pt. 2; Feb. 1994 (pp. 103-114).

"Adaptive 3-D Skeletonization of Noisy Images Using NxNxN Connectivity Analysis Windows and Robust Surface Detection," by W. He, A.R. Cohen, J.N. Turner and B. Roysam; IEEE Transactions on Information Theory for Biomedicine; (accepted, to appear) 2002.

"Three-Dimensional Quantitative Coronary Angiography," by T. Saito, M. Misaki, K. Shirato and T. Takishima; IEEE Transactions on Biomedical Engineering, vol. 37, No. 8; Aug. 1990 (pp. 768-777).

"Confocal Laser Scanning Microscopy and 3-D Reconstructions of Neuronal Structures in Human Brain Cortex," by P. Belichenko and A. Dahlstrom; Neuroimage, 2; 1995 (pp. 201-207).

"Locating Blood Vessels in Retinal Images by Piecewise Threshold Probing of a Matched Filter Response," By A. Hoover, V. Kouznetsova, and M. Goldbaum; IEEE Transactions on Medical Imaging, vol. 19, No. 3; Mar. 2000 (pp. 203-210).

"Detection of Blood Vessels in Retinal Images Using Two-Dimensional Matched Filters," by S. Chaudhuri, S. Chatterjee, N. Katz, M. Nelson, and M. Goldbaum; IEEE Transactioins on Medical Imaging, vol. 8, No. 3; Sep. 1989 (pp. 263-269).

"Coronary Borders in Complex Images," by M. Sonka, M. Winniford, and S. Collins; IEEE Transactions On Medical Imaging, vol. 14; Mar. 1995 (pp. 151-161).

"A Nonsmoothing Approach to the Estimation of Vessel Contours in Angiograms," by M. Figueiredo and J. Leitao; IEEE Transactions in Medical Imaging, vol. 14, No. 1; Mar. 1995 (pp. 162-172).

"Adaptive Vectorization of Line Drawing Images," by R. Janssen and A. Vossepoel; Computer Vision and Image Understanding, vol. 65, No. 1; Jan. 1997 (pp. 38-56).

Directional Low-Pass Filtering for Improved Accuracy and Reproducibility of Stenosis Quantification in Coronary Arteriograms, by Y. Sun, R. Lucariello, and S. Chiaramida; IEEE Transactions on Medical Imaging, vol. 14, No. 2; Jun. 1995 (pp. 242-248.

"Recursive Tracking of Vascular Networks in Angiograms Based on the Detection-Deletion Scheme," by I. Liu and Y. Sun; IEEE Transactions on Medical Imaging, vol. 12, No. 2; Jul. 1993 (pp. 334-341).

"Fully Automated Reconstruction of Three-Dimensional Vascular Tree Structures from Two Orthogonal Views Using Computational Algorithms and Production Rules," by I. Liu and Y. Sun; Optical Engineering, vol. 31, No. 10; Oct. 1992 (pp. 2197-2207).

"Automated Identification of Vessel Contours in Coronary Arteriograms by an Adaptive Tracking Algorithm," by Y. Sun; IEEE Transactions of Medical Imaging, vol. 8, No. 1; Mar. 1989 (pp. 78-88).

* cited by examiner

METHOD AND APPARATUS FOR AUTOMATICALLY TRACING LINE-STRUCTURE IMAGES

This application claims the benefit of U.S. Provisional Patent Application Ser. No. 60/264,056, filed on Jan. 26, 2001, the contents of which are incorporated in this application by reference.

FIELD OF THE INVENTION

The present invention is directed generally toward the domain of image processing and, in particular, toward automatically tracing line structures in images.

BACKGROUND OF THE INVENTION

The quantitative morphology of linear branched structures in biological tissues is of broad interest. Imaging of these structures provides information concerning the condition of various tissues. For many line-structures, however, quantitative analysis is necessary for rigorous assessment and medical diagnosis. Examples of relevant line-structures include blood vessels, neurons, and retina.

Of particular interest for quantitative analysis are automated two-dimensional (2-D) and three-dimensional (3-D) tracing and morphometry methods for neurons in thick slices of brain tissue. The neurons are imaged by 2-D or 3-D microscopy. Analysis of these images provides traces of dendrites and axons, and produces graph-theoretic or tabular representation of these structures. The analysis captures the essential topological characteristics, providing a number of topological and metric measurements useful in medical evaluation.

The ability to effectively analyze biological tissues depends on the availability of efficient, fast, and robust quantitative techniques that can provide the requisite measurements mentioned above. Currently, most line-structure tracing is conducted by tedious and time-consuming manual tracing. The time and effort required is so large that studies involving large cell sets are precluded. These manual methods typically tolerate low accuracy and suffer from intra- and inter-user inconsistencies.

Some current methods do provide for semi-automatic neuron tracing. In these semi-automatic methods, a human interacts with a microscope enhanced with computer imaging hardware and software. The user performs pattern recognition, and the computer system records the data and generates topological and metric analyses. In some cases, the computer assists the human by automatically aligning a cursor to the nearest image feature or by automatically focusing the microscope. In either case, the operator must trace each neuronal structure manually. A device implementing semi-automatic neuron tracing follows the spatial path of a dendrite after the device is initially set at the proximal part of a dendrite and has been provided with an initial direction of the dendritic path.

The available methods employ various computational approaches. Three approaches have been identified for the analysis of linear branched structures such as neurons and vasculature. One approach is based on skeletonization of the line structure and branch point analysis. A second approach is a chaining method based on enhancing edge and line properties and identifying vessel contours by chaining the edge pixels together. A chaining method usually involves dynamic programming to search for a minimal cost path, Markov chaining, or maximizing the likelihood of a path. Both of these approaches require processing every image pixel with numerous operations per pixel.

Another approach is referred to variously as vectorization, vectorial tracking, or tracing. Vectorization involves first locating an initial point and then exploiting the local image properties to trace the structures recursively. These types of calculations are appropriately termed "exploratory algorithms" as only pixels close to the structures are processed. This approach is particularly relevant when processing speed is crucial, such as in real-time image analysis, or when data sets are very large.

Broadly, three categories of exploratory algorithms or processing techniques are described in the literature. Quantitative coronary angiography (QCA) involves manually entering the initial and end points of a vessel. A tentative centerline might also be entered on occasion. Although these algorithms are very accurate, they are designed to trace vessel segments with no branching or intersection regions and in conditions where speed of calculation is not of great concern.

In a second category, the algorithm starts with a manually entered initial point and an initial direction, and recursively traces the entire arterial tree using a breadth-first search. In the context of neurons, this approach corresponds to tracing a single axon or dendrite tree that is efferent from a single soma. Such methods are not suitable for images containing several neurons with each neuron having several processes efferent from it. The third category includes fully automated methods that tend to overcome the limitations of the first two categories.

Most of the prior work done with vectorization addresses 2-D images or projections of 3-D images. A need remains, however, to extend this work to handle 3-D (volumetric) image space. A related need exists to provide a set of adaptations to handle the imaging artifacts specific to fluorescence confocal microscope images, especially noise, the point-spread function, and discontinuities in structures.

SUMMARY OF THE INVENTION

To meet these and other needs, and in view of its purposes, the present invention provides a method of automatically tracing a line-structure with an end in an image. The method comprises the steps of: 1) locating a seed point; 2) defining a position and a direction for the seed point; 3) tracing a centerline of the line structure from the seed point; and 4) stopping the centerline trace at the line-structure end. The method may further comprise identifying a plurality of candidate seed points and selecting a seed point from the plurality of candidate seed points. The method may also include tracing the centerline of the line structure by translating from the seed point to a succeeding trace point.

According to another aspect of the invention, a program storage device readable by a machine, which tangibly embodies a program of instructions executable by the machine, is provided. With the program of instructions, the machine performs the method steps for automatically tracing a line-structure comprising an end in an image. The method steps comprise 1) locating a seed point; 2) defining a position and a direction for the seed point; 3) tracing a centerline of the line structure from the seed point; and 4) stopping the centerline trace at the line-structure end.

It is to be understood that both the foregoing general description and the following detailed description are exemplary, but are not restrictive, of the invention.

BRIEF DESCRIPTION OF FIGURES

The invention is best understood from the following detailed description when read in connection with the accompanying figures. It is emphasized that, according to common practice, the various features of the figures are not to scale. On the contrary, the dimensions of the various features are arbitrarily expanded or reduced for clarity. Included are the following figures.

DETAILED DESCRIPTION OF THE INVENTION

The present invention overcomes many of the problems of previous approaches to tracing line-structure images. This benefit is accomplished using a vectorization-based approach that provides fully automatic tracing of 2-D and 3-D line-structure images.

Figure 1:
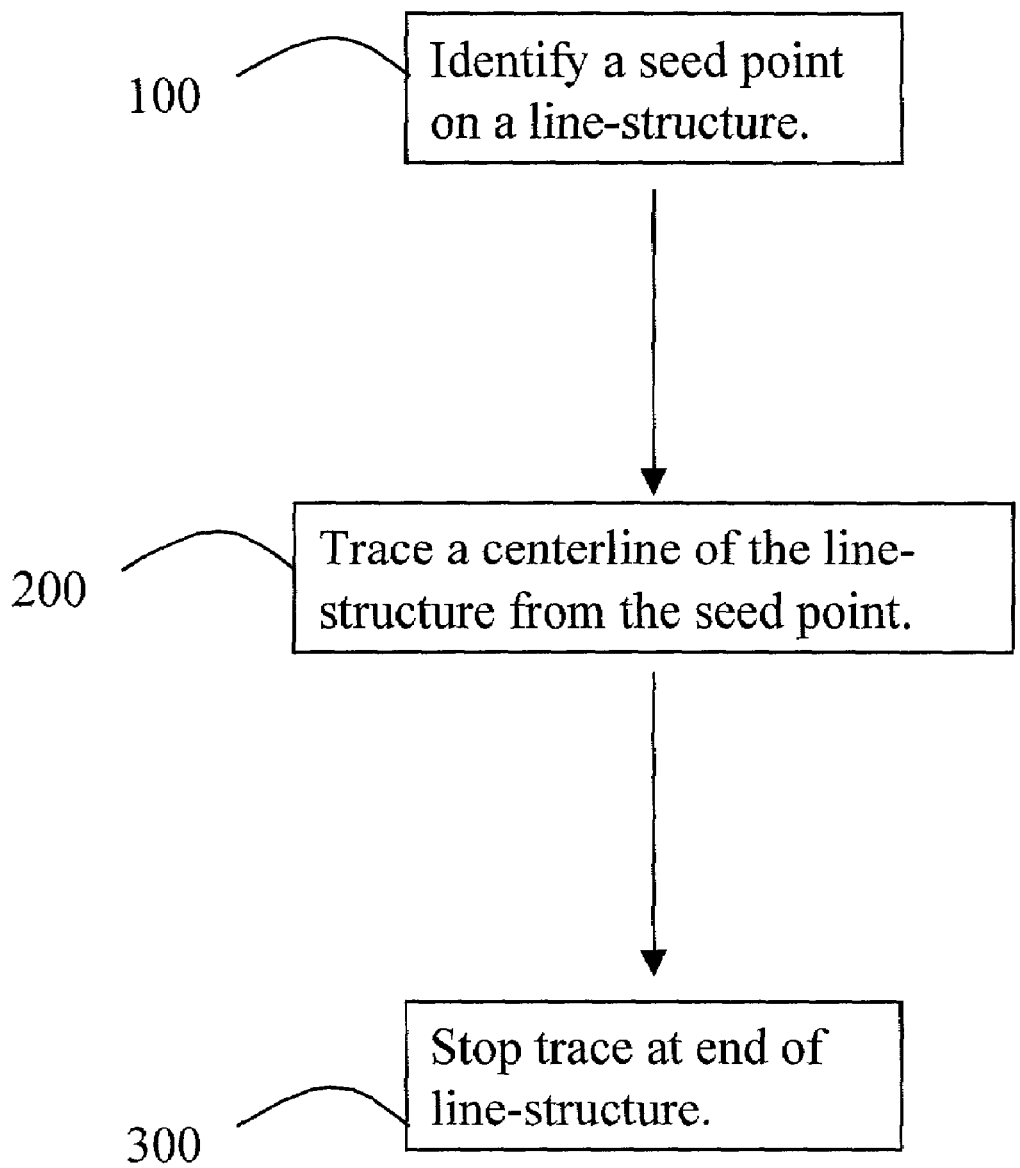
FIG. 1 is a flowchart of the basic components of the method of the present invention.

The flowchart of FIG. 1 diagrams the basic components of the present invention. The vectorization method first identifies a seed point on a line-structure, in step 100, through a series of operations that filter image data points and locate points on a line-structure. The method then traces the centerline of the line structure, in step 200, from the seed point, through an iterative refinement process, until the end of the line-structure is reached. Finally, in step 300, the tracing is terminated at the end of the line-structure according to an automatic termination analysis process.

The invention is directed towards analyzing line-structures in general. To assist in describing the method of the invention, 2-D and 3-D images acquired using a laser-scanning confocal microscope provide a context for the applicability of the invention. For 3-D images, volumetric optical density measurements are provided by the laser-scanning confocal microscope. The invention is applicable to a variety of images containing line-structures.

Typical imaging artifacts encountered include variable quantum noise, point spread, signal attenuation with depth, and non-uniformity of staining causing apparent discontinuity in structures. These are challenges that arise in a variety of imaging applications.

The large size of 3-D confocal images (10–100 MB) also presents a challenge. Even a modest operation can entail excessive computation if repeated at each voxel of the image. This problem is circumvented in the present invention by avoiding operations that process each voxel.

Generally, the present invention avoids calculations at every voxel by employing an adaptive exploratory search of the image that is conducted directly at the voxel intensity level. Computations are limited to the sparse structure of interest and, therefore, scales with the complexity of the neurons rather than image size. The resulting algorithms are highly adaptive because they rely on local image information.

A. A Generalized Cylinder Model for Line-Structures

The analysis operations performed by the present invention are based in part on a generalized cylinder model of line structures. Over a short distance, line-structures in an image field are often well approximated by generalized cylinders. Generalized cylinders have elliptical cross sections and some curvature along their center axis.

The generalized cylinder model may be applied to line structures broadly. As an example, there are particular considerations when applying this model to neuronal images. By their nature, the images of confocal imaging processes are typically non-isotropic, with maximum separation along the optical axis of the microscope. Therefore, the principal axes are aligned with the optical axis. Accordingly, the cross-sectional ellipses are well sampled along just two, instead of three, directions.

Two-dimensional images can be modeled using the projection of this model into 2-D space. The intensity of a pixel interior to a segment is directly proportional to the line integral of the corresponding voxel intensities in the 3-D model, where the integral is performed along a line parallel to the optical axes.

Figure 7:
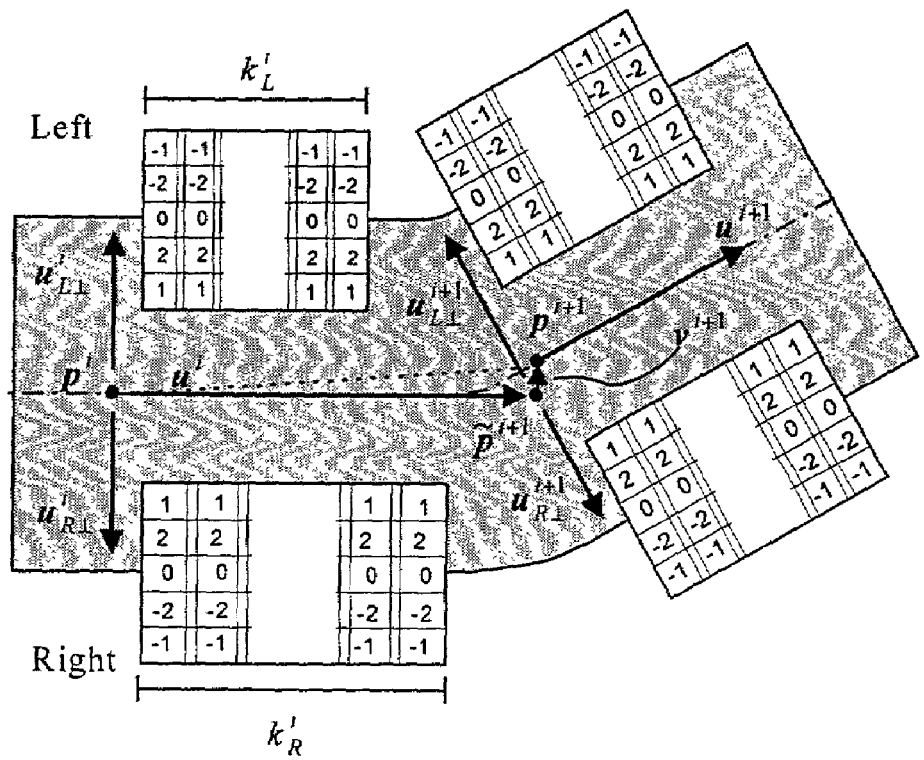
FIG. 7 is a diagram that illustrates the application of low-pass differentiator kernels for the tracing of 2-D structures.

B. Directional Matched Low-Pass Differentiator Templates for Tracing Generalized Cylinders The tracing algorithms used to perform the operations of the invention include a set of correlation kernels applying low-pass differentiators. These kernels were obtained by combining a three-point Lagrange differentiator, of the form $[1, 0, -1]/2$, with a three point moving average of the form $[1, 2, 1]/4$. This operation results in a single low-pass differentiator of the form $[-1, -2, 0, 2, 1]$. Concatenating K such kernels results in a two-dimensional kernel or template shown in FIG. 7. These correlation kernels have the form $[-1, -2, 0, 2, 1]^T$ perpendicular to the line-structures being traced. The kernels compute a moving average along their length. These kernels are illustrated in FIG. 7, for the case when the moving average is computed over K pixels. The 5×K kernel is referred to as a "template" in this document. Separate templates are constructed for application at the various boundaries of the structures and along different orientations. Typically, the rotation angle is discretized to a small number of values, such as 16 or 32. The templates and their application are discussed in more detail below, in the context of tracing operations.

The generalized cylinder model and the application of correlation kernels are referred to throughout the following description of the invention operation.

C. Identifying a Seed Point

The analysis process of the present invention begins with selecting appropriate trace starting points. These starting points are called seed points. The step of selecting the seed points requires filtering candidate seed points in the image based on several criteria.

The seed point selection mechanism preferably ensures that the tracing algorithm is provided with a seed point on or near the centerline of the line-structure, and an initial direction for every segment. Once identified, a seed point is used twice, once in the specified direction and a second time in the opposite direction. Redundant seed points are generated to assure complete coverage.

The seed point selection mechanism is a two-step process. In the first step, a pool of seed point candidates is generated. In the second step, unfit candidates are eliminated.

1. Step 1: Line Searches Over a Coarse Grid

A 3-D image may be projected onto the x-y plane using a grid of N horizontal lines and M vertical lines superimposed on the projected 2-D image, denoted $I_{xy}$. Seed candidates are identified by performing a set of M+N line searches over the image $I_{xy}$. The distance between consecutive lines, i.e. the grid spacing, g, may be set empirically. In the case of neuronal images, the grid spacing was set to 20 pixels based on the observation that many dendrites or axons are narrower than 20 pixels. The grid spacing parameter may be variable or fixed as appropriate for a particular application.

Additional image data manipulation may be performed. For example, the gray-level values on each line of neuron images were low-pass filtered using a 1-D kernel of the form $[0.25, 0.5, 0.25]^T$. A kernal operates on the gray level values of each line by multiplying the kernel's values with the pixel intensities. For example, with a sequence of image intensities of [ . . . , 10, 20, 40, 50, 60, 70, . . . ], applying the above kernel on the pixel 40, gives 37.5 (=0.25*20+0.5*40+0.25*50).

Seed point candidates are identified as local intensity maxima on each line identified using a 1-D neighborhood of g pixels. In addition to being a local maximum, a seed point candidate has intensity larger than $\mu_{xy}+\alpha_{xy}$, where $\mu_{xy}$ is the median pixel intensity of projected image $I_{xy}$, and $\alpha_{xy}$ is the standard deviation around the median pixel intensity.

Figure 3:
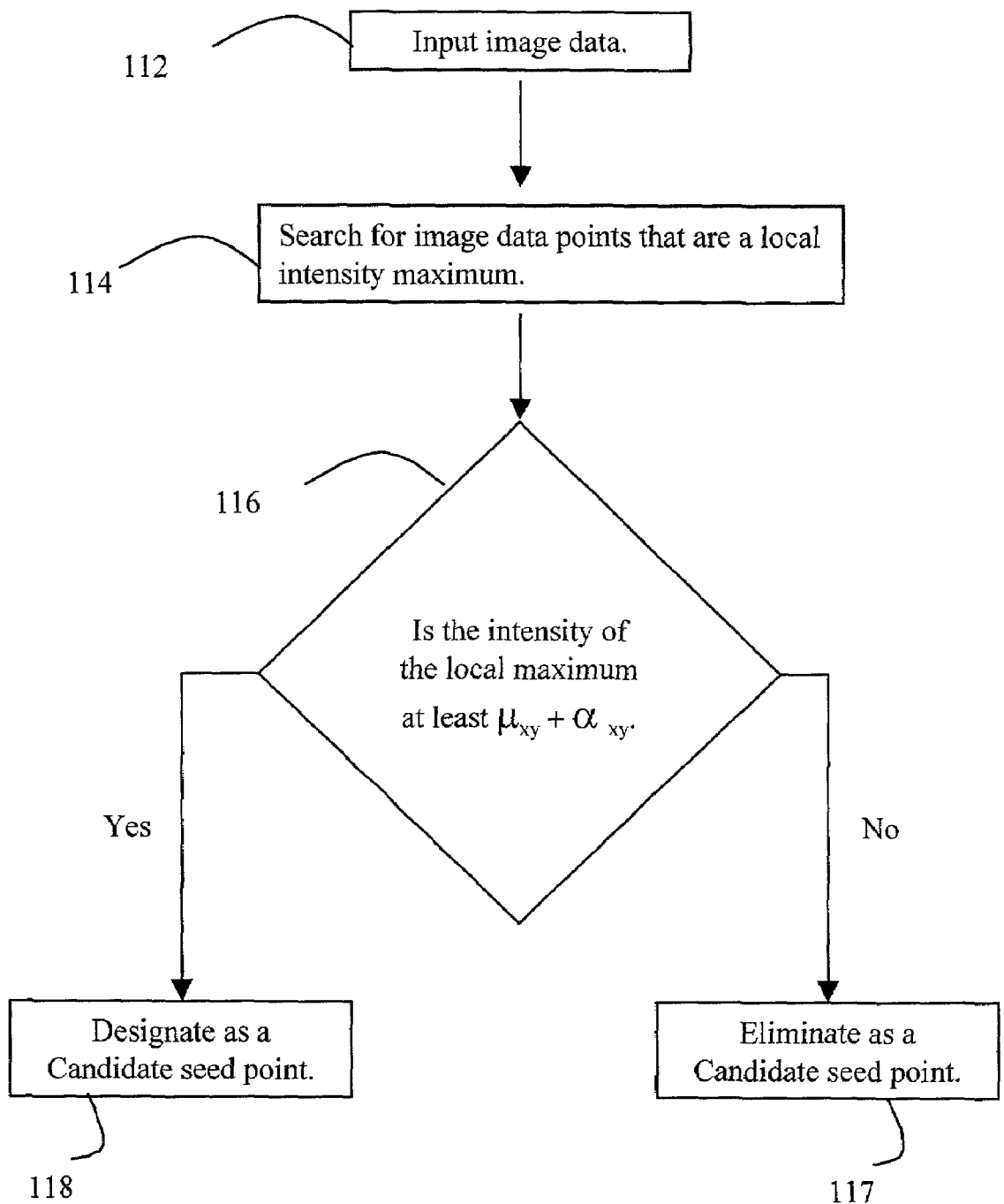
FIG. 3 is a flowchart of a method to identify candidate seed points according to the present invention.

This process of identifying candidate seed points is illustrated in FIG. 3. The image data are collected or provided, in step 112, and a search over the image for points that are local intensity maximum is performed in step 114. The local intensity maxima are evaluated and compared to the median pixel intensity and the standard deviation of intensity around the median in step 116. Those points that have intensity less than the threshold value are eliminated as a candidate seed point, in step 117, and those local maxima that have intensity satisfying the threshold are designated as candidate seed points in step 118. The candidate seed points are subsequently filtered.

2. Step 2: Filtering the Results of Step 1

Figure 2:
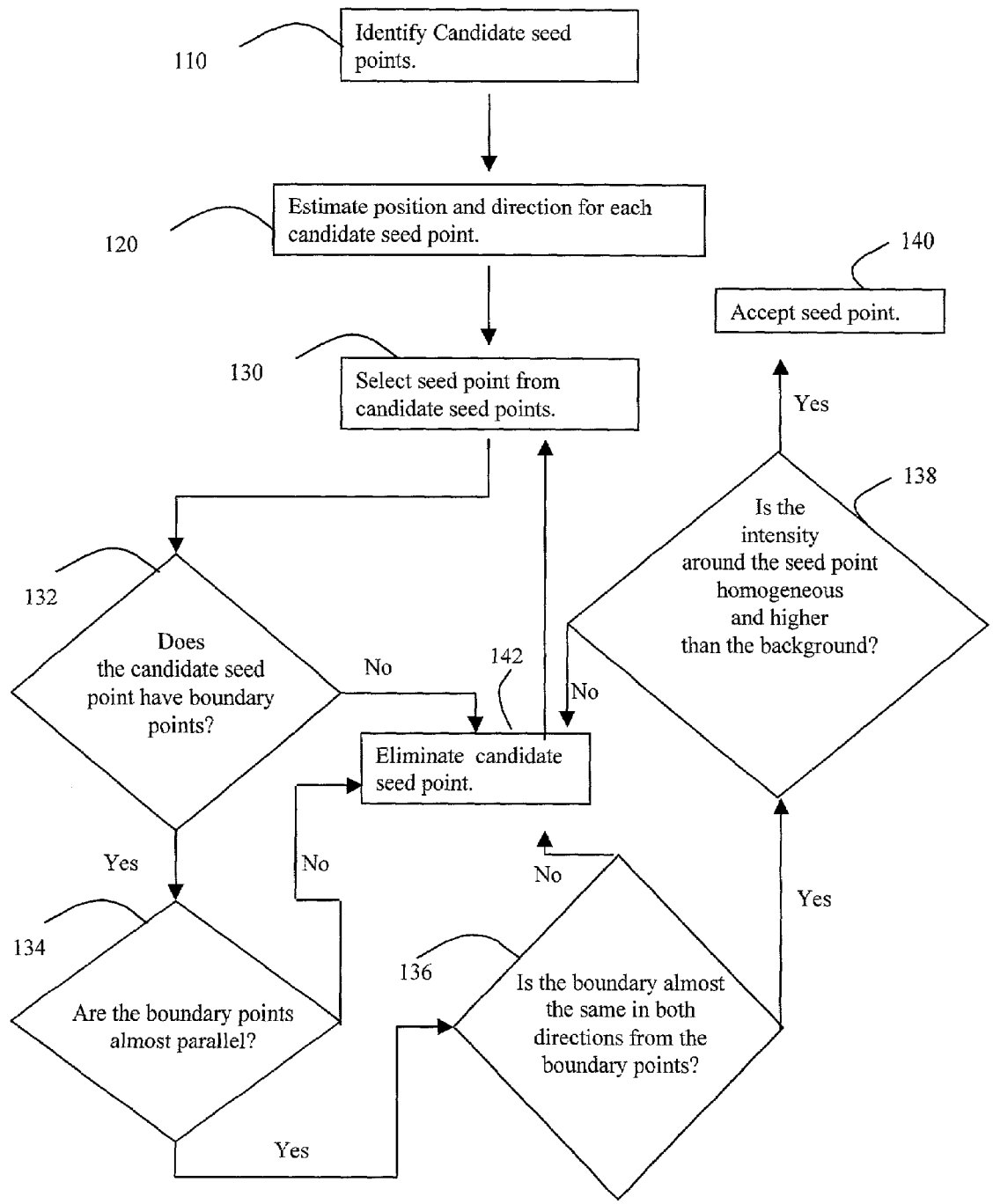
FIG. 2 is a flowchart of a method to identify image seed points according to the present invention.

The method of filtering the candidate seed points to identify acceptable seed points is illustrated in the flow chart of FIG. 2. The candidate seed points are identified, in step 110, through the method described above with reference to FIG. 3. A position and direction are estimated for each candidate seed point in step 120. Next, a series of calculations are performed to evaluate the validity of the candidate seed point in step 130.

These calculations address the question of whether the candidate seed point has boundary points. That question is posed in step 132. Typically, these boundary points will be restricted to a certain radius around the candidate seed point. If appropriate boundary points are identified, and a direction is calculated, the boundary point directions are compared for uniformity and completeness. More specifically, in step 134, the boundary points are evaluated for parallelism and, in step 136, the boundary is evaluated to ascertain whether it is almost the same in both directions from the boundary points. In addition, the intensity around the candidate seed point is evaluated and compared to the background intensity in step 138. If any one of these selection criteria is not met, the candidate seed point is eliminated in step 142. A seed point is accepted, in step 140, only if all of the criteria are satisfied.

Many of the points generated in the first step correspond to noise and must be filtered out to avoid erroneous traces. For a seed point candidate p(x,y) located in the projection image $I_{xy}$, this filter is achieved as follows. The shift and correlate procedure is applied using all right and left templates lying in the x-y plane.

The shift and correlate process comprises two primary procedures. The term shift denotes the process by which a template is moved away from the centerline point, or seed point, along a line perpendicular to the boundary direction ($u^{L,i}$ in FIG. 7). The shift is performed along such a line one pixel at a time and at each pixel. Once the shift is performed, the template is applied to the image intensities to perform the correlate procedure. Template application, or correlation, produces a template response. Applying a template comprises multiplying the template cells (in this embodiment: −1, −2, 0, 2, 1) with the underlying pixel intensities and then taking the sum of all multiplications.

The templates, described in more detailed below, are a matrix of low-pass differentiator kernels that calculate an intensity and direction response when applied to the image pixel data. The right and left templates used are templates with orientations u. The application of the templates produces a total of 64 right and left boundary points.

Figure 9:
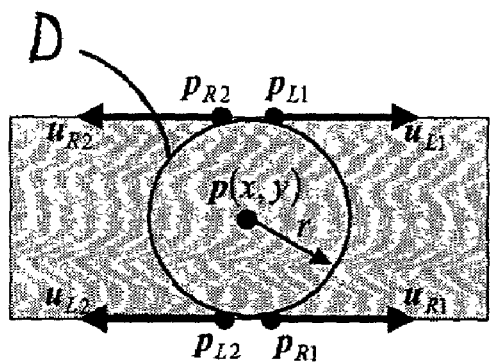
FIG. 9 is a diagram illustrating boundary points and directions around a candidate seed point.

Two maximum right and two maximum left template responses, $\hat{R}_1(u_{R1}, k, p_{R1})$, $\hat{R}_1(u_{R2}, k, p_{R2})$ and $\hat{L}_1(u_{L1}, k, p_{L1})$, $\hat{L}_2(u_{L2}, k, P_{L2})$, respectively, are located around a candidate seed point p(x,y). As illustrated in FIG. 9, each maximum template response includes position (p) and direction (u) information, as well as the length of the template, (k).

These maximum responses are evaluated according to the following conditions:

1. $u_{R1}$ and $u_{R2}$ must be almost opposite, or the inner product of the directions satisfy $u_{R1} \cdot u_{R2} \leq \cos(\pi \pm 2\pi/N)$. A similar relation must also hold between $u_{L1}$ and $u_{L2}$;

2. $u_{R1}$ and $u_{L1}$ must be almost parallel, or $u_{R1} \cdot u_{L1} \neq \cos(2\pi/N)$. A similar relation must also hold between $u_{R2}$ and $u_{L2}$;

3. The interior of the segment around the seed point candidate p(x,y) must be uniform. To illustrate, a circular disk, D, of radius $r=\frac{1}{4}(\|p_{R1}-P_{R2}\|+\|P_{L1}-P_{L2}\|)$ is centered at p(x,y) as shown in FIG. 9. With γD as the median intensity of image pixels in D, and σD as the standard deviation around the median, the candidate seed point must satisfy the uniformity condition $\sigma D < \sigma_{xy}$, where $\sigma_{xy}$ is the standard deviation of the image around the median image intensity.

4. The distance between $P_{R1}$ and $P_{L2}$ must be less than r pixels. Similarly, the distance between $P_{R2}$ and $P_{L1}$ must be less than r pixels where r is the radius of the circular disc around the candidate seed point.

5. The median intensity of the interior of the segment around the candidate seed point p(x,y) must be larger than that of the 2-D image $I_{xy}$. In terms of the disk defined above, this is stated as $\gamma D > (\gamma_{xy} + \sigma_{xy})$.

Only candidate seed points satisfying conditions 1 through 5 are accepted as seed points.

The points validated in the above procedure were obtained from the projection 2-D image $I_{xy}$, hence they lie in the x-y plane. A procedure is presented below to estimate the z coordinates of such points to locate the corresponding 3-D seed points.

Let $P_{xy}$ (x1, y1) be a valid seed point. Let $P_{xyz}$ be the corresponding 3-D seed point with the same x and y values. The value of the z-coordinate z1 is estimated as the plane with maximum local intensity in the neighborhood of (x1, y1). A disk similar to the one defined in condition 3 above defines the local neighborhood. With D(x, y, z, r) defining a disk of radius r and centered at the point p(x, y, z), the intensity of a 3-D image voxel is denoted by I(x, y, z), and the image depth is denoted by Z. The z-coordinate of the 3-D seed point is estimated according to:

$$z_1 = \underset{z \in 1,\cdots,Z-1}{\mathrm{argmax}} \sum_{p(x',y',z') \in D(x_1,y_1,z)} I(x',y',z')$$

A 3-D seed selection and validation procedure may be used instead of the hybrid 2-D and 3-D procedure described above. Such a procedure involves searching for local maxima along (N+M)Z/g lines, and 4096 applications of the shift and correlate procedure at each of the detected maxima. The hybrid procedure involves N+M search lines and 64 applications at each detected maxima, reducing computation requirements.

The tracing method may further avoid seed point variations in tracing line-structure images by further ranking valid seed points based on fitness factors. One such fitness factor to be considered is the distance from the line-structure ends in the image, with further distances having better fitness rankings. Accepted seed points may also be ranked according to their overall template response sum (i.e., $\hat{R}_1 + \hat{R}_2 + \hat{L}_1 + \hat{L}_2$).

A schematic illustrating locations of four boundary points ($P_{R1}$, $P_{R2}$, $P_{L1}$, $P_{L2}$) associated with a candidate seed point (p(x, y)) is shown in FIG. 9. The boundary points have directions $u_{R1}$, $u_{R2}$, $u_{L1}$, $u_{L2}$, respectively. The subscripts R and L stand for Right and Left. The circular disk of radius r is used in estimating the uniformity and intensity characteristics of the interior area of the segment. The seed point p(x,y) shown in FIG. 9 satisfies the criteria set forth above as a valid, or accepted, seed point.

D. Tracing a Line Structure From a Seed Point

Figure 4:
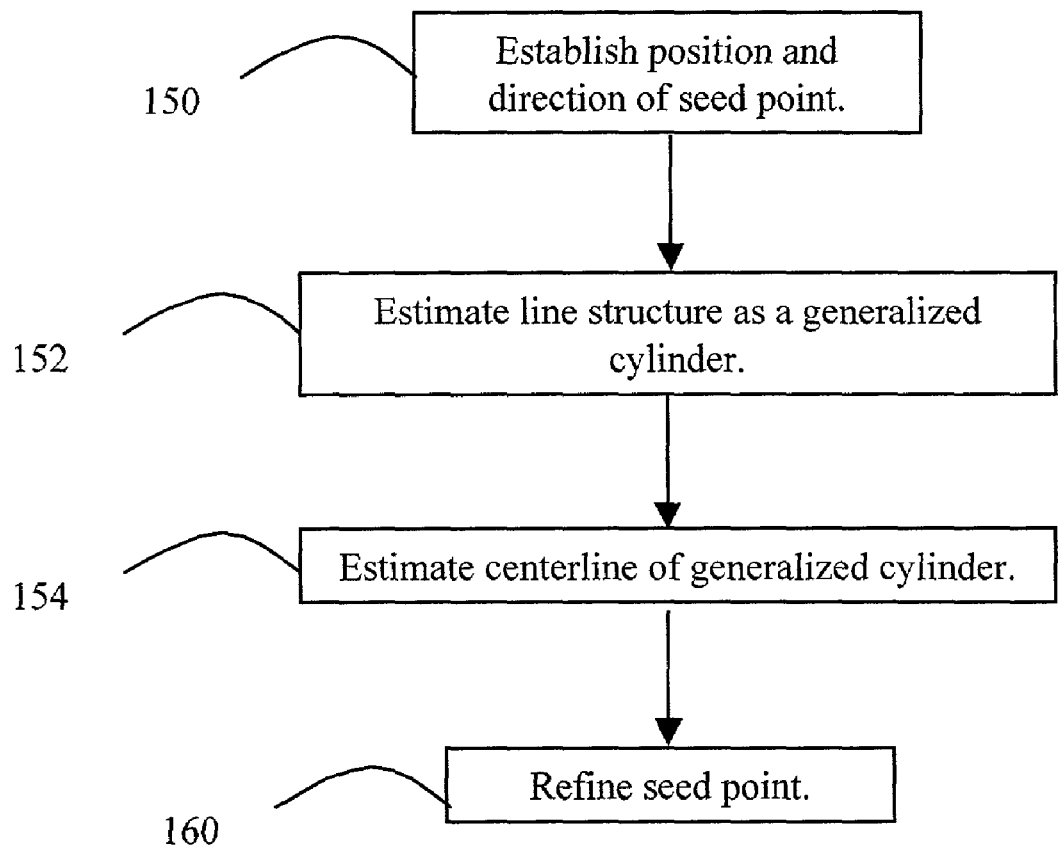
FIG. 4 is a flowchart of an exemplary method to initiate line-structure image tracing according to the present invention.

Once a seed point has been selected for a particular tracing operation, a series of calculations are performed to trace the line-structure. The basic organization of the calculations is presented in the flowchart of FIG. 4. The position and direction of the seed point are estimated in step 150 and the line structure is modeled as a generalized cylinder in step 152 with a centerline estimated in step 154. The seed point position is refined, in step 160, to agree with the centerline of the generalized cylinder.

The tracing process for a 2-D structure is illustrated in FIG. 7. The application of the low-pass differentiator kernels as directional templates is shown schematically. Starting from a seed point, $p^i$, on the centerline of the structure, with a direction along the centerline, $u^i$, a search is performed using the templates along the directions perpendicular to the centerline direction in a left direction ($u^i_{L\perp}$) and a right direction ($u^i_{R\perp}$). This search identifies left and right boundary points of the structure. The boundary points are located at the edge of the 2-D structure.

At each point along these search lines, the kernel responses are computed and the boundary points are estimated at points of maximal responses. The directions of the maximal response kernels as well as the current direction, $u^i$, determine a direction along which to take a step to the next centerline point, according to $\sim p^{i+1} = p^{i+\alpha u^i}$, where $\alpha$ is a step size and $\sim p^{i+1}$ is an estimate of the next centerline point. The symbol "$\sim$" indicates an approximation.

The actual next centerline point is determined, however, according to $p^{i+1} = \sim p^{i+1} + v^{i+1}$, where $c^{i+1}$ is a correction vector that is a function of the left and right boundary points at step i+1. The direction of the next centerline point, $u^{i+1}$, is determined using a weighted average combining $u^i$ and the directions of the maximum response kernels at step i+1. The resulting trace (centerline) is represented by a dotted line in the figure. In addition, FIG. 7 illustrates kernels having different lengths, denoted $k_R^i$ and $k_L^i$.

Directions in 2-D space can be described in terms of the angle $\theta$ describing a counterclockwise rotation in the x-y plane. For simplicity, the angle is discretized to N values. The value of N can be set by the user to best sample the curvature of the structures of interest. For the application under consideration, N=32 yielding an angular precision of 11.25° over 360° and a total of 64 templates, taking into account the "left" and "right" templates.

Figure 8A:
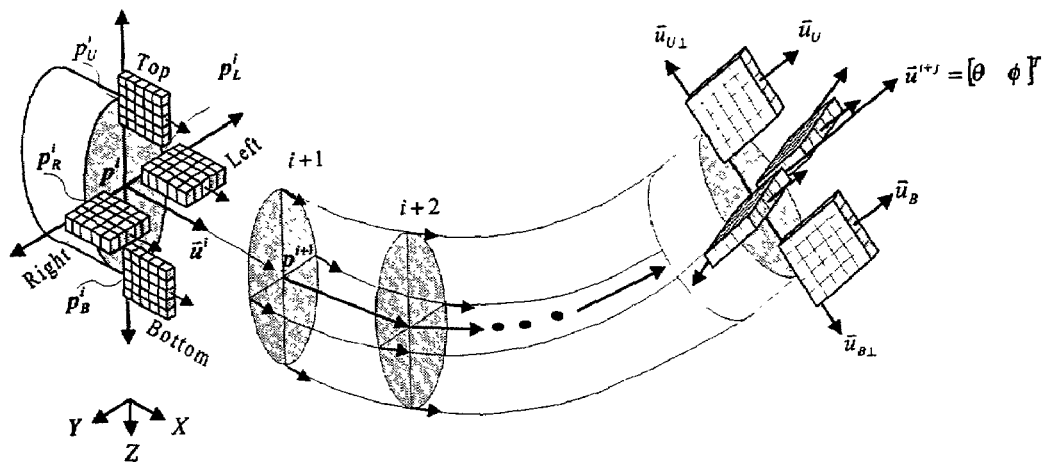
FIGS. 8A and 8B are diagrams that illustrate the application of low-pass differentiator kernels for the tracing of 3-D structures.
Figure 8B:
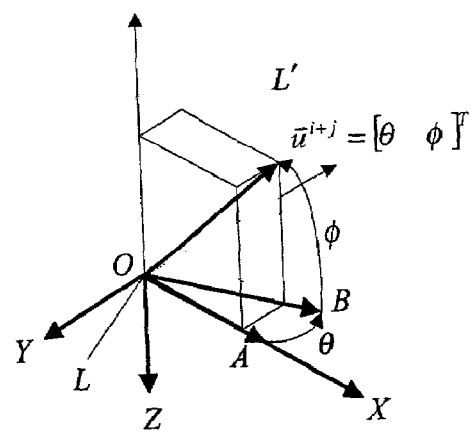

The extension of this method to a 3-D structure is illustrated schematically in FIGS. 8A and 8B. FIG. 8A illustrates the trace steps along a line structure using 4 templates, the Left and Right templates of the 2-D method, as well as a Top and Bottom template. Analogous to the 2-D case, the templates are applied along the length of the structure being traced. The third dimension is sampled in two perpendicular planes, as a function of the generalized cylinder model previously described. Four sets of templates labeled "Right," "Left," "Upper," and "Bottom," respectively, are defined. Similar to the 2-D case, the templates most closely oriented along the generalized cylinder and centered on the boundary produce a maximum response. This feature is exploited to conduct the tracing.

Directions in 3-D space are described in terms of two angles, $\theta$ and $\phi$. As illustrated in FIG. 8B, $\theta$ describes a rotation around the Z-axis and $\phi$ describes a rotation around the line L L' which is the Y-axis after being rotated by $\theta$ degrees around the Z-axis. The angular directions in the coordinate system shown in FIG. 8B follow the right-hand rule and $\theta$ describes the same angle as in the 2-D case. Both $\theta$ and $\phi$ are each discretized to N values, resulting in a total of N×N angular directions.

The value of N may be set by the user to best sample the curvature of the structures of interest. For the example under consideration, N=32 was used, which yields an angular precision of 11.25° and a total of $N^2$=1024 unique directions. The total number of unique templates considering four sets of templates, right, left, upper, and bottom, is therefore 4×$N^2$=4096.

Referring again to FIG. 8A, the perpendicular direction $u_\perp$ is the line along which the templates are applied repeatedly to conduct a search for the boundary points. These directions are illustrated in FIG. 7 for the 2-D case, and in the right-hand part of FIG. 8A for the 3-D case.

As shown in FIG. 8A, four sets of low-pass differentiator kernels are used for tracing 3-D structures, instead of two. Starting from the point $p^i$, the left, right, top, and bottom boundary points, denoted $p^i_R$, $p^i_L$, $p^i_U$, and $p^i_B$, respectively, are detected. Each of the kernels is applied in N×N angular directions. The directions of the strongest kernel responses together enable estimation of the local centerline direction $u^i$ along which to take a step, similar to the 2-D case. The right-hand portion of FIG. 8A illustrates more of the notation used in the text.

FIG. 8B illustrates more clearly the coordinate system for specifying angular directions. A unit vector $u^{i+j}$ (also illustrated on the right-hand part of FIG. 8A), is obtained by rotating the vector OA by θ degrees relative to the X-axis, in the x-y plane, and then rotating the resulting vector (i.e., OB) by φ degrees relative to the x-y plane.

The length of the templates may be allowed to vary. Longer templates perform more averaging along the structures and may be necessary to trace noisy or discontinuous structures. Longer templates might be unsuitable, however, for tracing highly tortuous structures. The number of angular quantization levels N imposes a lower limit on the value of the length k of the template according to:

$$k \geq \frac{1}{\sin\left(\frac{2\pi}{N}\right)}$$

At equality, templates along adjacent directions differ by at most one pixel or voxel at their far end. In an embodiment of the invention directed toward neuronal tracing, the template length (k) varies between 8 and 50.

The tracing process continues with correlating the templates with the image. The template response $R(u_R, k, p)$ denotes the correlation response of a right template of length k and a direction $u_R$ using image data $I(x, y, z)$ when the template is centered at the image point $p(x, y, z)$. Similar notation is used for the left, top, and bottom templates.

E. Application of the Templates to 2-D and 3-D Neuron Tracing

Tracing of a line-structure according to an embodiment of the present invention proceeds as follows. Starting from a point $p^i$ on the centerline axis, with an initial estimate of the direction $u^i$, the line-structure is traced recursively, estimating successive points $p^{i+1}$, $p^{i+2}$, ..., along the centerline of the line-structure.

Figure 5:
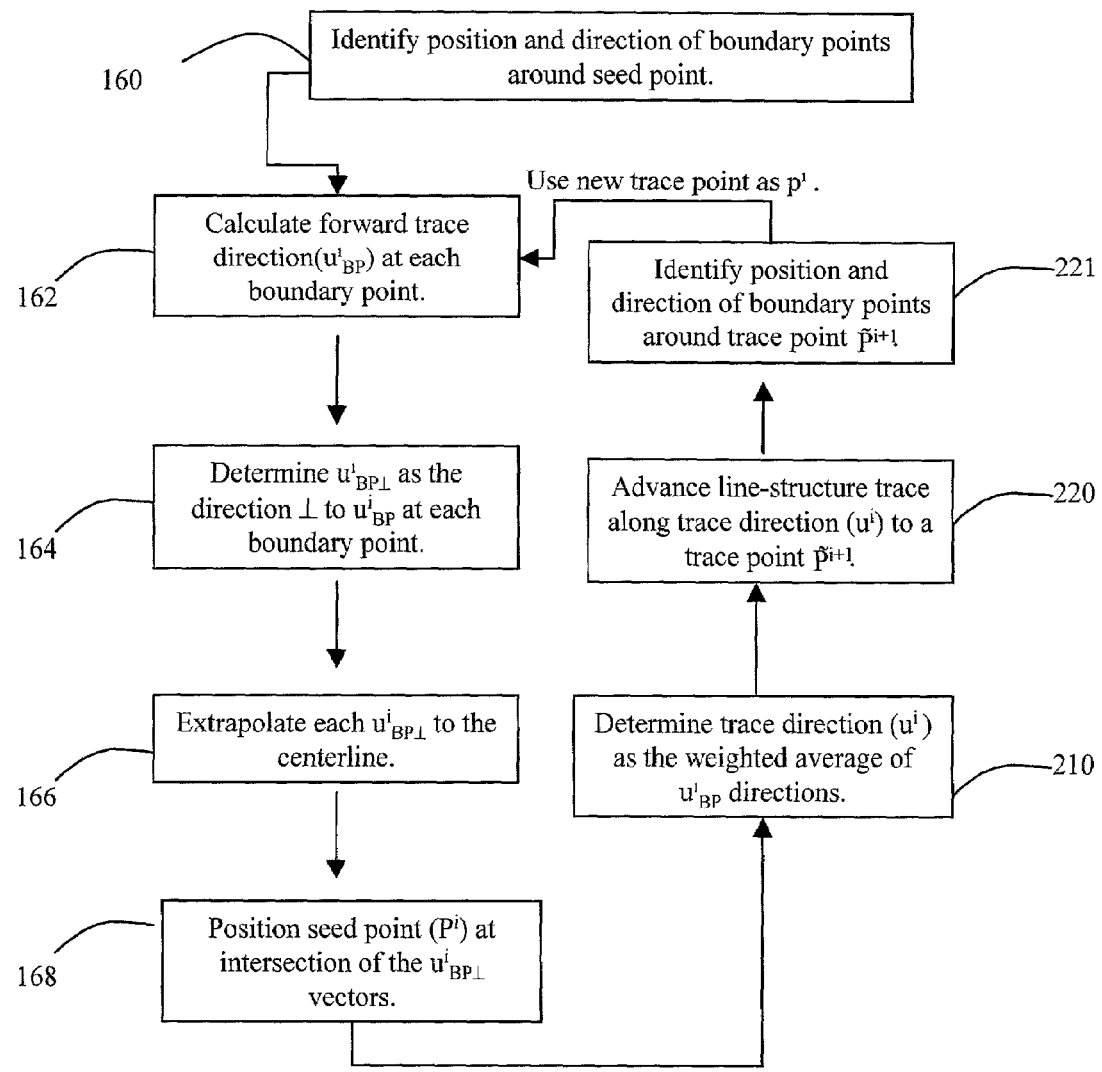
FIG. 5 is a flowchart of a method of tracing a line-structure according to the present invention.

The process of recursively tracing the line-structure is illustrated in the flowchart of FIG. 5. As illustrated, the position and direction of the boundary points around a seed point are identified in step 160. A forward trace direction ($u^i$BP) is calculated, in step 162, at each boundary point (BP). From the forward trace direction, a perpendicular direction ($u^i$BP$_\perp$) is determined in step 164. The perpendicular vectors are extrapolated to the centerline, in step 166, to refine the position of the initial seed point. The seed point ($p^i$) is positioned at the intersection of the perpendicular vectors, in step 168, and the trace direction ($u^i$) is calculated from the weighted average of the $u^i$BP trace vectors in step 210. The line-structure trace is advanced in the trace direction a step to a new trace point ($\sim p^{i+1}$) in step 220. The same point refinement procedure is performed at this subsequent trace point in steps 221, 162, 164, 166, and 168 and, once the trace point position has been refined, another trace step is taken in step 220.

The trace step size in this procedure may be a predetermined number of image pixels, as appropriate for the type of image being traced. A predetermined number of image pixels means a reasonably predictable, as opposed to random, number. The step size is a function of the template length K, and in the case of neuron tracing, was set to 0.3*K. Values other than 0.3 may be used based on the image type. The trace step size is preferably selected so that minor changes in the line-structure centerline are detected throughout the trace.

The tracing algorithm employed is first described using templates of fixed length k. This restriction may be relaxed in practice.

As described above, maximal template responses determine boundary points around an initial seed point. The orientations of the templates when a maximal response is detected provide the initial set of local direction estimates at the boundary points. For the right and left templates, this information is described mathematically as:

$$(p_R^i, u_R^i) = \left\{ \begin{array}{c} \mathrm{argmax} \\ (p, u_R) \mid p = \tilde{p}^i + m u_{R\perp}, m = 1, \cdots, M/2, \text{ and } u_R \in \sum \end{array} \right\}$$
$$R(u_R, k, p);$$

$$(p_T^i, u_T^i) = \left\{ \begin{array}{c} \mathrm{argmax} \\ (p, u_T) \mid p = \tilde{p}^i + m u_{T\perp}, m = 1, \cdots, M/2, \text{ and } u_T \in \sum \end{array} \right\}$$
$$T(u_T, k, p)$$

where m is a number of image pixels or voxels and M is the maximum expected line-structure diameter and Σ is the set of all possible directions. The equations for the other two templates (top and bottom) are analogous. The maximum line-structure may be estimated empirically based on the nature of the line-structure.

The maximal response of the right template at the boundary point is denoted as $\hat{R}^i(u_R^i, k, p_R^i)$. The notation of the other templates is similar. The location and direction estimates ($\sim p^i$ and $\sim u^i$, respectively) can be refined by applying the templates in the following manner:

$$p^i = \frac{\tilde{p}^i}{2} + \left[ \frac{\hat{R}^i x_R^i + \hat{L}^i x_L^i}{2(\hat{R}^i + \hat{L}^i)}, \frac{\hat{R}^i y_R^i + \hat{L}^i y_L^i}{2(\hat{R}^i + \hat{L}^i)}, \frac{\hat{T}^i z_T^i + \hat{B}^i z_B^i}{2(\hat{T}^i + \hat{B}^i)} \right]^T;$$

$$u^i = \frac{\tilde{u}^i}{2} + \left[ \frac{\hat{R}^i \hat{s}_{1R}^i + \hat{L}^i \hat{s}_{1L}^i}{2(\hat{R}^i + \hat{L}^i)}, \frac{\hat{T}^i \hat{s}_{2T}^i + \hat{B}^i \hat{s}_{2B}^i}{2(\hat{T}^i + \hat{B}^i)} \right]^T$$

The z-coordinate is set to zero for 2-D calculations. The refined $p^i$ and $u^i$ estimates are then used to trace the next centerline position, and estimate the next centerline direction as $\sim p^i = p^i + \alpha u^i$ and $\sim u^{i+1} = u^i$.

The calculations can be reduced substantially because it is not necessary to correlate the templates at all M/2 points or each iteration, i. This reduction is possible because most line-structures will be narrower than M points. M is determined to be inclusive of an upper diameter range. Computation reduction may also be achieved by limiting the number of directions in which template responses are calculated. A subset of vector directions can be limited to direction vectors adjacent to the estimated trace direction.

As noted above in describing FIG. 7, the template length (k) may be fixed or allowed to vary. With respect to the template response algorithms, a variable length template response is normalized to the length, so that the actual response is meaningful in regards to the boundary edge. A length-normalized template response is defined as the response per unit length of a template.

F. Stopping the Trace

In order to avoid calculating line-structures outside the structure being traced, such as an adjacent line-structure, or generating false positive line structures, the shift and correlate process of the tracing procedure must have a mechanism for terminating at appropriate places on the trace. Specifically, the present invention includes a series of criteria indicating an appropriate trace stopping point, which is determined automatically. For example, the tracing procedure is terminated when the maximum template response is not larger than a fixed threshold. Tracing is also terminated when the response drops below 20% a of the maximum detected response in the trace.

An embodiment of the present invention also includes stopping the line-structure trace at the end of the line-structure. Automatically stopping a tracing operation can be difficult. The method presented provides for stopping the trace when a series of specified criteria have been satisfied.

Tracing is terminated upon reaching the end of the traced segment or upon straying away from the segment into the background. This situation is expressed as multiple consecutive violations of the following conditions:

1. The sum of the four maximum template responses is larger than a threshold according to:

$$\hat{R}^i + \hat{L}^i + \hat{u}^i + \hat{B}^i > 3 * C * (k_R^i + k_L^i + k_U^i + k_B^i),$$

where C is the image contrast between the foreground and overall median intensities $\mu_F$ and $\mu_I$, respectively, as measured by the difference $C = \mu_F - \mu_I$.

2. The average intensity of the traced structure is at least one gray level higher than that of the local background. This condition translates to requiring the maximum response of each of the four templates to be larger than a threshold. For a right template this is expressed as $\hat{R}^i > 3k_R^i$. Conditions for the other templates are analogous.

3. The maximum template response at a boundary point should be larger than the response of a template applied at the same point orthogonal to the boundary and pointing into the interior of the segment. This evaluation effectively flips the template at the boundary point to the interior of the line-structure to evaluate the uniformity of intensity between the interior and exterior of the line-structure. A sensitivity factor, $\alpha$, can be determined empirically according to the nature of the image being analyzed. With a sensitivity factor of 2, the maximum template response at a boundary point would need to be at least twice the template response calculated when the template is applied in a direction orthogonal to the boundary in order to avoid violating this criterion.

During the trace procedure, each of the above conditions is analyzed at each iteration, i, and the number of violations are counted. Tracing terminates when the number of consecutive violations is larger than a threshold value. The threshold value is determined by the operator and optimized for the particular application. A combination of the above criteria tolerates responses that are characteristic of the background as long as such responses are isolated events due to noise and image artifacts.

For a threshold value of three, any three consecutive violations of any one criterion, or any combination of three violations of any of the criteria, terminates the trace of the line-structure.

Figure 6:
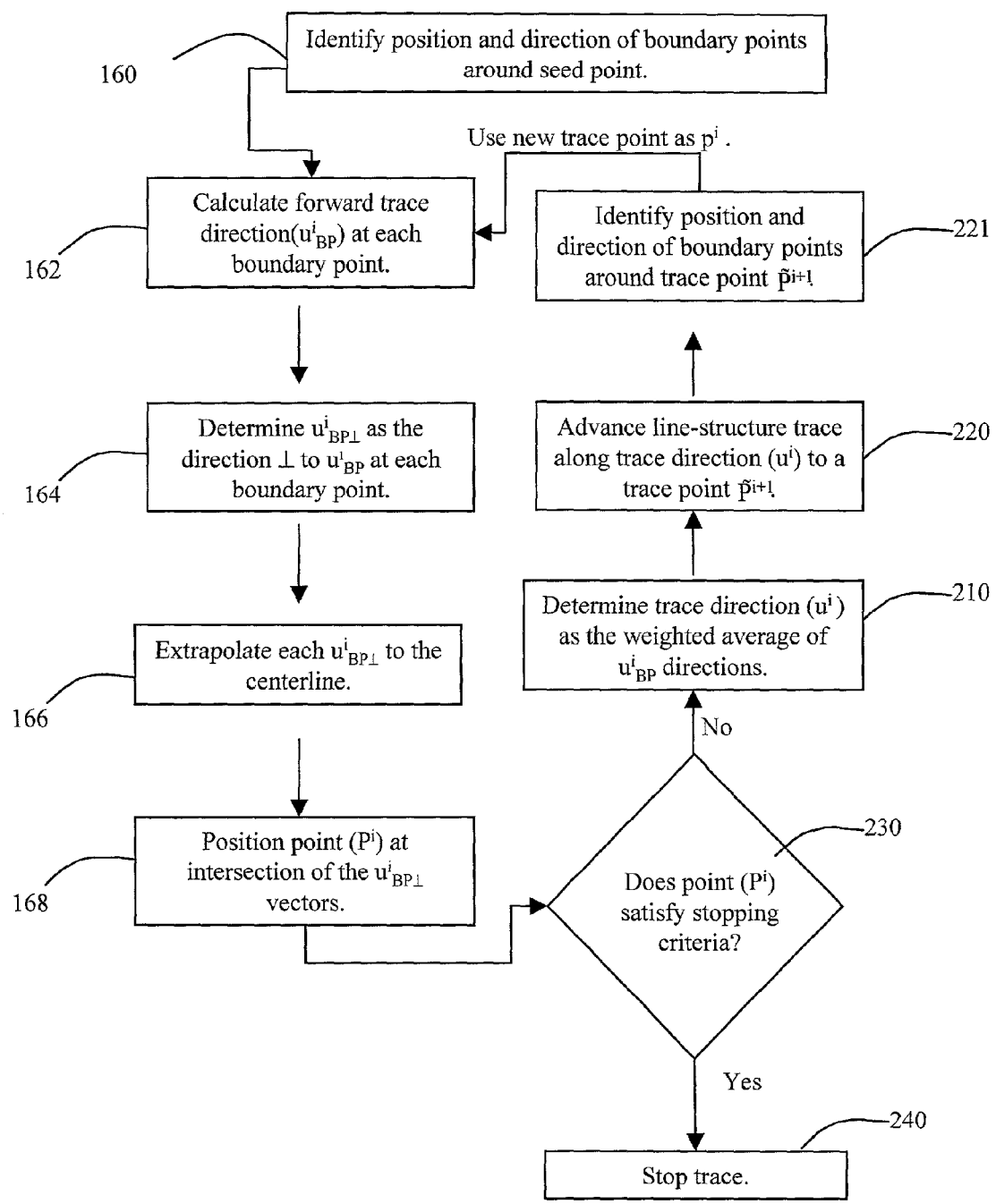
FIG. 6 is a flowchart of an exemplary method of tracing a line-structure according to the present invention.

Each trace point may be examined as a potential end point as an integral part of the tracing procedure. FIG. 6 illustrates how a stopping criteria test 230 is incorporated into the method of the present invention. Once the trace point position is refined, in step 168, the calculations regarding the end point analysis described above are performed. Next, an evaluation of whether to continue tracing in step 210, or to stop the trace via step 240, is conducted.

In summary, a method of automatically tracing a line-structure has been described. One embodiment of the method includes identifying candidate seed points in the image. A seed point is selected from the candidate seed points. This seed point represents a point on a center axis of a generalized cylinder. The generalized cylinder has a cylindrical surface encompassing a center axis. Boundary points corresponding to the seed point are then determined using a median or average template calculation. The boundary points correlate to points on the surface of the generalized cylinder. A boundary point trace direction is determined at each boundary point by evaluating a median or average template response calculation. A direction perpendicular to the boundary point trace direction is also determined at each boundary point. The seed point is positioned at an intersection of lines extending from the boundary points in the direction perpendicular to the boundary point trace direction. The line-structure is traced to a first trace point on the center axis of the generalized cylinder. The first trace point is a discrete step in the trace direction from the seed point.

Another embodiment of the present invention includes a computer programmed with instructions to carry out an automatic tracing method as described above. In addition, still another embodiment includes a program storage device readable by a machine that includes programmed instructions for automatically tracing line-structures as described above. Each of the embodiments of the invention ultimately may provide an image analysis output. The image analysis output may be a graph-theoretic or a tabular representation of the line-structure in the image.

Although illustrated and described above with reference to certain specific embodiments, the present invention is nevertheless not intended to be limited to the details shown. Rather, various modifications may be made in the details within the scope and range of equivalents of the claims and without departing from the spirit of the invention.

What is claimed:

1. A method of automatically tracing a line-structure comprising an end in an image, the method comprising the steps of:
   a. locating a seed point;
   b. defining a position and a direction for the seed point;
   c. tracing a centerline of the line-structure from the seed point; and
   d. stopping the centerline trace at the line-structure end based on comparing an edge intensity of the line structure at a boundary point surrounding a trace point to a threshold intensity value.

2. The method of claim 1 wherein the step of locating a seed point comprises identifying a plurality of candidate seed points and selecting a seed point from the plurality of candidate seed points.

3. The method of claim 2 wherein the step of identifying the plurality of candidate seed points comprises identifying image data points that (1) are a local intensity maximum, and (2) have an intensity of at least a sum of a median intensity value and an intensity standard deviation over the intensity variation of the image.

4. The method of claim 2 wherein the step of selecting the seed point comprises calculating a position intensity and a boundary direction at a plurality of boundary points surrounding the plurality of candidate seed points.

5. The method of claim 4 wherein the step of selecting the seed point comprises evaluating the boundary directions at the plurality of boundary points.

6. The method of claim 4 wherein the step of selecting the seed point comprises evaluating a boundary edge at the plurality of boundary points.

7. The method of claim 2 wherein the step of selecting the seed point comprises calculating an intensity of the image surrounding the candidate seed point.

8. The method of claim 7 wherein the step of selecting the seed point comprises evaluating the intensity homogeneity surrounding the candidate seed point.

9. The method of claim 1 further comprising refining the seed point position by extrapolating toward the centerline from a plurality of boundary points, the boundary points representing positions on a surface of a generalized cylinder, and the seed point representing a position on a center axis of the generalized cylinder.

10. The method of claim 1 wherein the step of tracing the centerline of the line structure comprises translating from the seed point to a trace point.

11. A method of automatically tracing a line-structure comprising an end in an image, the method comprising the steps of:
    a. locating a seed point;
    b. defining a position and a direction for the seed point;
    c. tracing a centerline of the line-structure from the seed point; and
    d. stopping the centerline trace at the line-structure end, wherein the step of tracing the centerline proceeds in a trace direction, the trace direction being the weighted average of a trace direction at a plurality of boundary points.

12. The method of claim 10 wherein the step of tracing the centerline comprises refining a position of the trace point.

13. The method of claim 1 wherein the step of stopping the centerline trace comprises comparing the edge intensity of the line-structure at a plurality of boundary points surrounding a trace point to a threshold intensity value.

14. The method of claim 1 wherein the step of stopping the centerline trace comprises comparing uniformity of an interior region of the line-structure with uniformity of a boundary of the line-structure in the image.

15. The method of claim 1 further comprising creating an image analysis output, the image analysis output selected from one of a graph-theoretic or a tabular representation.

16. A method of automatically tracing a line-structure comprising an end in an image, the method comprising the steps of:
    a. identifying a plurality of candidate seed points in the image;
    b. selecting a seed point from the plurality of candidate seed points, wherein the seed point represents a point on a center axis of a generalized cylinder, the generalized cylinder having a cylindrical surface encompassing the center axis;
    c. determining a plurality of boundary points corresponding to the seed point, the boundary points correlating to a plurality of points on the surface of the generalized cylinder;
    d. determining a boundary point trace direction at each boundary point and determining a direction perpendicular to the boundary point trace direction at each boundary point;
    e. positioning the seed point at an intersection of lines extending from the plurality of boundary points in the direction perpendicular to the boundary point trace direction; and
    f. tracing the line-structure to a first trace point on the center axis of the generalized cylinder, the first trace point being a discrete step in the trace direction from the seed point.

17. The method of claim 16 further comprising:
    g. determining a second plurality of boundary points corresponding to the first trace point;
    h. determining a second boundary point trace direction at each boundary point corresponding to the first trace point and determining a direction perpendicular to the first trace point boundary point trace direction;
    i. positioning the first point at an intersection of lines extending from the plurality of first trace point boundary points in the direction perpendicular to the first trace point boundary point trace direction; and
    j. tracing the line-structure to a second trace point on the center axis of the generalized cylinder, the second trace point being a discrete step in the trace direction from the first trace point.

18. The method of claim 17 further comprising determining a successive trace point on the center axis of the generalized cylinder, the successive trace point being a discrete step from a previous seed point.

19. The method of claim 16 wherein the step of tracing the line-structure comprises determining the trace direction by calculating a weighted average of the boundary point trace directions.

20. The method of claim 16 wherein the step of identifying the plurality of candidate seed points comprises identifying image data points that (1) are a local intensity maximum, and (2) have an intensity of at least a sum of a median intensity value and an intensity standard deviation over the intensity variation of the image.

21. The method of claim 16 further comprising determining an end of the line-structure.

22. An image analyzing system to automatically trace a line-structure comprising an end, the system comprising;
    a. means for locating a seed point on the line-structure in an image;
    b. means for defining a position and direction for the seed point;
    c. means for tracing a centerline of the line-structure from the seed point;
    d. means for stopping the centerline trace at the line-structure end; and
    e. means for comparing an edge intensity of the line structure at a boundary point surrounding a trace point to a threshold intensity value.

23. A program storage device readable by a machine, tangibly embodying a program of instructions executable by the machine to perform the method steps for automatically tracing a line-structure comprising an end in an image, the method steps comprising:
    a. locating a seed point on the line-structure in an image;
    b. defining a position and direction for the seed point;
    c. tracing a centerline of the line-structure from the seed point; and
    d. stopping the centerline trace at the line-structure end based on comparing an edge intensity of the line structure at a boundary point surrounding a trace point to a threshold intensity value.

24. A program storage device readable by a machine, tangibly embodying a program of instructions executable by the machine to perform the method steps for automatically tracing a line-structure comprising an end in an image, the method steps comprising;
   a. identifying a plurality of candidate seed points in the image;
   b. selecting a seed point from the plurality of candidate seed points, wherein the selected seed point represents a point on a center axis of a generalized cylinder, the generalized cylinder having a cylindrical surface encompassing the center axis;
   c. determining a plurality of boundary points corresponding to the selected seed point, the boundary points correlating to a plurality of points on the surface of the generalized cylinder;
   d. determining a boundary point trace direction at each boundary point and determining a direction perpendicular to the boundary point trace direction at each boundary point;
   e. positioning the selected seed point at an intersection of lines extending from the plurality of boundary points in the direction perpendicular to the boundary point trace direction; and
   f. tracing the line-structure to a first trace point on the center axis of the generalized cylinder, the first trace point being a discrete step in the trace direction from the selected seed point.

* * * * *